United States Patent Office 3,538,078
Patented Nov. 3, 1970

3,538,078
DIGOXIN ETHERS
Fritz Kaiser, Lampertheim, Wolfgang Schaumann and Kurt Stach, Mannheim-Waldhof, and Wolfgang Voigtländer, Viernheim am Kurpfalzplatz, Germany, assignors to Boehringer Mannheim Gesellschaft mit beschrankter Haftung, Mannheim-Waldhof, Germany, a corporation of Germany
No Drawing. Filed Sept. 12, 1968, Ser. No. 759,502
Claims priority, application Germany, Sept. 20, 1967, B 94,555; May 7, 1968, 1,768,372
Int. Cl. C07c 173/00
U.S. Cl. 260—210.5                                    9 Claims

ABSTRACT OF THE DISCLOSURE

Digoxin derivatives wherein one or two hydroxyl groups of the digitoxose moiety are etherified with alkyl groups containing 1 to 2 carbon atoms, which alkyl groups can be substituted by alkoxy groups containing 1 to 2 carbon atoms, wherein when only one of the hydroxyl groups is etherified, the second can be esterified with an acyl group containing up to 3 carbon atoms, which acyl group can be substituted by an alkoxy group containing 1 to 2 carbon atoms.

These digoxin derivatives are highly effective therapeutic agents and are suitable for oral administration in the treatment of cardiac insufficiency.

Digoxin has the formula:

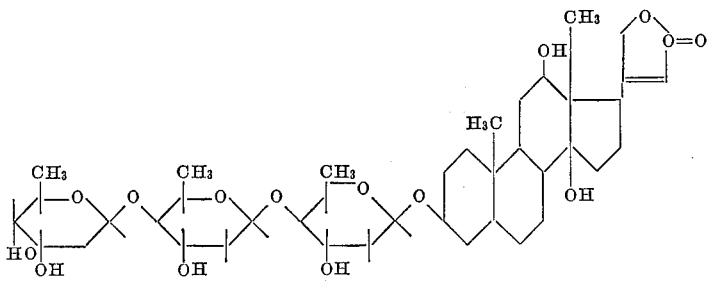

This invention relates to digoxin ethers and to methods for preparing and using such compounds. More particularly, this invention relates to compounds in which one or two hydroxyl groups of the digitoxose moiety are etherified with unsubstituted or substituted alkyl groups containing 1 to 2 carbon atoms, wherein as substituent there are present alkoxy groups containing 1 to 2 carbon atoms, and, when only one hydroxyl group of the digitoxose moiety is etherified, the second hydroxyl group can be esterified by a substituted or unsubstituted acyl group containing up to 3 carbon atoms, wherein as substituent there is intended an alkoxy group containing 1 to 2 carbon atoms.

The new compounds described and claimed herein are enterally better resorbed than digoxin per se, and also than the known monoacyl derivatives of digoxin, and are, therefore, outstandingly suitable as therapeutic agents for oral administration to humans in the treatment of cardiac insufficiencies.

The new digoxin ethers according to the present invention are obtained according to one aspect of the process of the present invention by reacting digoxin with a conventional O-alkylation agent, such as an alkyl halide, dialkyl sulfate or diazo-alkane, possibly followed by reaction with about one equivalent of an appropriate acylation agent.

The ethers of this invention are prepared by reacting digoxin, for example in the presence of a base and possibly with gentle warming, with approximately one or two equivalents of a suitable alkyl halide or dialkyl sulfate, followed by working up of the reaction product in the conventional manner. However, care should be taken to avoid conditions in which the reaction mixture comes into contact with mineral acids or with other strong, aqueous acids as this results in the splitting off of the digitoxose moiety. Depending upon the amount of alkylation agent used for the reaction, there is preponderantly obtained either mono- or diethers of digoxin.

According to another aspect of the method of the invention for preparing the new ethers, digoxin is reacted, in the presence of a mildly acidifying catalyst, such as boric acid, a boric acid trialkyl ester, aluminum isopropylate, ferric chloride or the like, with a diazo-alkane. In this case, too, it is to be noted that some of the catalysts which might otherwise be considered, such as boron trifluoride, are too acidic and, to a considerable extent, result in the formation of decomposition products. This particular method usually results in the formation of the monoalkyl derivatives of digoxin.

The constitution of the new derivatives has not yet been completely elucidated. In the case of the monoethers, it is possible that the 3'''- or 4'''-position of the terminal digitoxose moiety is etherified, while in the case of the diethers, it appears that one hydroxyl group in each of the terminal and middle digitoxose moieties is etherified. There are also certain indications for believing that, depending upon the reaction conditions used, there are obtained either the 3'''- or 4'''-derivatives of digoxin. However, the improved resorption in the case of enteral administration is found to the same extent in all of the new derivatives of digoxin in which 1 or 2 hydroxyl groups are etherified or etherified and acylated in the manner according to the present invention. As soon as 3 or more hydroxyl groups are blocked and alkyl radicals with substantially more carbon atoms are introduced, the effectiveness or the enteral resorption of the substances decreases so considerably that it is no longer possible to achieve any advantages in comparison with digoxin. Therefore, in the case of the use of strong alkylation agents, care is to be taken that the etherification does not proceed too far and that not more than two hydroxyl groups are alkylated.

The preparation of the new digoxin derivatives in which one hydroxyl group is etherified and another is acylated, is carried out in the conventional manner by reacting a digoxin monoether, under gentle conditions, with about one equivalent of one of the acylating agents common in sugar chemistry, such as an acid anhydride, acid imidazolide, acid chloride in pyridine, p-toluenesulfonic acid chloride in pyridine and the free acid, and the like. However, care must be taken that the reaction results in not more than one hydroxyl group in the digitoxose moiety being acylated.

For a fuller understanding of the nature and objects of the invention, reference may be had to the following examples which are given merely as further illustrations of the invention and are not to be construed in a limiting sense.

EXAMPLE 1

1 g. digoxin and 500 mg. aluminum isopropylate were dissolved in 4 ml. dimethyl formamide and 10 ml. methylene chloride and the solution, under stirring at ambient temperature, was thoroughly mixed, over a period of 60 minutes, with 60 ml. of a 3% solution of diazo-methane in methylene chloride. After 2 hours, the resulting reaction mixture was diluted with water and extracted with chloroform. The chloroform extract was dried over anhydrous sodium sulfate, evaporated under vacuum, and in order to separate off the by-products, was subjected to a multiplicative separation in a phase mixture of chloroform-benzene-methanol-water (2:1:2:1). After evaporating the organic phase and crystallizing the residue from chloroform-ether-petroleum ether, there were obtained 690 mg. digoxin monomethyl ether, which had a melting point of 227–231° C. (digoxin-3'''-monomethyl ether).

EXAMPLE 2

1 g. digoxin was dissolved in 12 ml. dimethyl formamide and, following the addition of 1.3 g. barium oxide and 1.3 g. barium hydroxide, mixed dropwise at ambient temperature, while stirring, with 2.9 ml. dimethyl sulfate. After the internal temperature of the reaction mixture had increased to 45° C., it was cooled. The cooled reaction mixture was then diluted with 150 ml. chloroform, filtered with suction and the filtrate washed with water. Following the addition of 1 g. calcium carbonate, the organic phase was evaporated under vacuum, the residue dissolved in ethyl acetate, filtered over silica gel and thereafter washed with ethyl acetate. The ethyl acetate filtrate was evaporated in a vacuum and the resulting residue dissolved in benzene-ethyl acetate (9:1) and fractionated over silica gel, the additions of ethyl acetate thereby being continuously increased. The benzene-ethyl actate fractions which contained about 60–70% ethyl acetate were collected and evaporated. After crystallization of the evaporation residue from chloroform-ether-petroleum ether, there were obtained 630 mg. digoxin monomethyl ether, which had a melting point of 226–229° C. (digoxin-4'''-monomethyl ether).

EXAMPLE 3

1 g. digoxin and 500 mg. aluminum isopropylate were dissolved in 4 ml. dimethyl formamide and 10 ml. methylene chloride, and, under stirring at ambient temperature, mixed over a period of 60 minutes with 40 ml. of a 3% solution of diazoethane in methylene chloride. After 2 hours, the reaction mixture was diluted with water and extracted with chloroform. The chloroform extract was dried over anhydrous sodium sulfate and evaporated in a vacuum. The residue, was dissolved in benzene-ethyl acetate (7:3), and fractionated over silica gel. Following evaporation of the collected fractions and the recrystallization of the residue from chloroform-ether, there were obtained 640 mg. digoxin monoethyl ether, which had a melting point of 191–194° C.

EXAMPLE 4

1 g. digoxin was reacted with 3.2 ml. dimethylsulfate according to the procedure described in Example 2. The resulting reaction mixture was stirred for 30 minutes at 45° C. and then further worked up. After fractionation over silica gel, the collected benzene-ethyl acetate fractions (6:4) were evaporated and the residue recrystallized from chloroform-ether-petroleum ether. There were obtained 480 mg. digoxin dimethyl ether which had a melting point of 189–191° C.

EXAMPLE 5

1 g. digoxin was dissolved in 10 ml. dimethyl formamide and 10 ml. dimethyl-aniline, mixed with 1.25 g. ethyl chloromethyl ether and warmed to 40° C. for 20 hours. The reaction mixture was thereafter evaporated in a vacuum and the residue fractionated over aluminum oxide. The chloroform-methanol fractions (97:3) were subjected for further purification to a multiplicative separation which was carried out using the phase mixtures chloroform - carbon tetrachloride - methanol - water (1:1:1:1) and carbon tetrachloride-ethyl acetate-methanol-water (3:1:2:2). Following extraction of the aqueous phase with chloroform, evaporation and recrystallization of the residue from chloroform-ether-petroleum ether, there were obtained 380 mg. digoxin mono(ethoxymethyl) ether, which had a melting point of 138–141° C.

EXAMPLE 6

1 g. digoxin was dissolved in 10 ml. dimethyl formamide and 10 ml. dimethyl-aniline, mixed with 1.25 g. chloromethyl methyl ether and warmed to 40° C. for 20 hours. The reaction mixture was then evaporated in a vacuum and the residue fractionated over aluminum oxide. The chloroform-methanol fractions (1.5% methanol) were further purified by multiplicative separation using the phase mixture carbon tetrachloride-ethyl acetate-methanol-water (3:1:2:2). The aqueous phase was extracted with chloroform and evaporated. The residue was then recrystallized from chloroform - ether - petroleum ether. There were recovered 410 mg. digoxin di-(methoxymethyl) ether having a melting point of 113–116° C.

EXAMPLE 7

650 mg. digoxin monomethyl ether (prepared according to the method described in Example 2) were dissolved in 3.25 ml pyridine, mixed with 85 mg. acetic anhydride and allowed to stand for 48 hours at ambient temperature. The reaction mixture was thereafter diluted with water, extracted with chloroform, the chloroform phase washed with 2 N sulfuric acid and water, dried over anhydrous sodium sulfate, filtered and the filtrate evaporated under vacuum. For purification of the product thereby obtained, there was carried out a multiplicative separation using the phase mixtures carbon tetrachloride-ethyl acetate-methanol-water (3:1:2:2) and chloroform-carbon tetrachloride - methanol - water (1:1:1:1). The residue which was obtained by evaporation of the organic phases was recrystallized from chloroform-ether and resulted in 430 mg. monoacetyl digoxin monomethyl ether, which had a melting point of 208–212° C. (monoacetyl digoxin-3'''-monomethyl ether).

EXAMPLE 8

2 g. digoxin monomethyl ether (prepared according to the procedure described in Example 1) were dissolved in 12 ml. pyridine, mixed with 2 ml. formic acid-acetic anhydride (1:1) and allowed to stand at ambient temperature for 2 hours. Following working up of the reaction mixture and separation by the method as described in Example 7, there were obtained, following recrystallization from chloroform-ether-petroleum ether, 1.2 g.

monoformyl digoxin monomethyl ether, which had a melting point of 136–140° C.

EXAMPLE 9

1.1 g. digoxin monomethyl ether (prepared by the method as described in Example 1) was dissolved in 5 ml. pyridine, mixed with 140 mg. acetic anhydride and allowed to stand for 48 hours at ambient temperature. The reaction mixture was then worked up and separated by the procedure set out in Example 7. There were recovered, following recrystallization from chloroform-ether, 630 mg. monoacetyl digoxin monomethyl ether, which had a melting point of 147–151° C. (monoacetyl digoxin-4‴-monomethyl ether).

EXAMPLE 10

1 g. digoxin monomethyl ether (prepared by the method as described in Example 2) was dissolved in 5 ml. pyridine, mixed with 400 mg. propionic acid anhydride and allowed to stand for 24 hours at ambient temperature. The reaction mixture was then further worked up and separated according to the method set out in Example 7. There were recovered after recrystallization from chloroform-ether-petroleum ether, 580 mg. monopropionyl digoxin monomethyl ether, which had a melting point of 138–141° C.

EXAMPLE 11

500 mg. digoxin monomethyl ether (prepared by the procedure described in Example 2) were dissolved in 10 ml. pyridine (cooled in ice) and then added, with ice cooling, to a mixture of 220 mg. ethoxyacetic acid, 10 ml. pyridine and 760 mg. p-toluene-sulfochloride. The reaction mixture was first allowed to stand for 1 hour, while cooling with ice, and for a further 24 hours at ambient temperature. After working up the reaction mixture according to the method described in Example 7, purification was carried out using a multiplicative separation and the phase mixtures of carbon tetrachloride-ethyl acetate-methanol-water (3:1:2:2) and carbon tetrachloride-ethyl acetate-methanol-water (9:1:6:4). Following extraction of the aqueous phase with chloroform, evaporation under vacuum and crystallization from chloroform-ether, there were obtained 320 mg. mono-(ethoxyacetyl) digoxin monomethyl ether, which had a melting point of 124–128° C.

EXAMPLE 12

680 mg. digoxin mono-(ethoxymethyl) ether (prepared by the method described in Example 5) were dissolved in 3.5 ml. pyridine, mixed with 182 mg. acetic anhydride and allowed to stand for 7 hours at ambient temperature. The reaction mixture was then worked up and separated by the procedure set out in Example 7. Following recrystallization from chloroform-ether-petroleum ether, there were recovered 350 mg. monoacetyl digoxin mono-(ethoxymethyl) ether, having a melting point of 128–131° C.

The compounds of this invention are useful in the preparation of medicinal agents because of their cardiopharmacodynamic actions.

Usually the digoxin ethers of the invention are administered orally, for instance in the form of tablets or pills. The new compounds can also be administered parenterally, for instance, by intravenous injection. For this purpose, they are employed in the form of injectable solutions in water or isotonic salt solutions.

The digoxin ethers according to the present invention are preferably not used as such in undiluted form but are diluted with suitable diluting agents as they are conventionally used as pharmaceutical carriers. Such dilution allows better and more economical use to be made thereof.

For making tablets, pills and other solid forms for medication, uniform dispersion of the active compound throughout the carrier is required. Such a fine and uniform dispersion is achieved for instance by intimately mixing and milling the digoxin ethers according to the present invention with a solid pulverulent diluent and, if required, with tableting adjuvants to the desired degree of fineness. One may also impregnate the finely pulverized, solid carrier, while milling, with a solution of the active compound in water or a suitable solvent and removing the solvent during such milling.

As solid pharmaceutical carriers, various inert pulverulent distributing agents, as they are conventionally used in the pharmaceutical industry, may be employed.

Solid diluents which are admixed to the active compounds, especially when preparing tablets, pills and other compressed forms, are the commonly used diluting agents, such as cornstarch, dextrose, lactose, sugar and the like. For making tablets and other compressed medication forms, binders such as pectins, gelatin, gum arabic, methylcellulose, yeast extract, agar, tragacanth, and lubricants such as magnesium stearate, calcium stearate, stearic acid, talc and the like are used.

The amount of digoxin ether present in such preparations may, of course, vary. It is necessary that the active ingredient be contained therein in such an amount that a suitable dosage will be ensured. Ordinarily the preparations should not contain less than about 0.1 mg. of the active digoxin ether. The preferred amount in orally administered preparations such as tablets, pills and the like, is between about 0.2 mg. and 1.0 mg. per day.

The doses to be administered vary according to the type of action desired, i.e., whether said action is to be digitalization on maintenance. It is, of course, understood that the physician will determine the proper amounts to be given to a patient depending upon the symptoms to be alleviated and the patient's condition and that the doses given above are by no means limiting the new digoxin ethers to such dosages.

Digoxin is a well known agent for use in the treatment of cardiac disturbances, i.e., cardiac failure, atrial fibrillation and flutter, paroxysmal tachycardia, cardiac insufficiency, etc. It has the advantage as compared to digitoxin that its onset of action is more rapid and is of shorter duration. In this connection it has the further advantage that in the event of an overdose, the symptoms associated therewith are more quickly dissipated. However, it is not as completely absorbed from the G.I. tract as digitoxin. Digoxin is absorbed only to the extent of 60–70%.

In order to establish the effectiveness of the compounds of the invention, i.e., their improved absorption rate, the compounds of the invention and digoxin as comparison compound were administered both intravenously and via the oral route and the absorption determined coincident with the determination of the pharmacological activity.

The criterion which was selected for measuring the effectiveness of the compound was the length of the period of time elapsing following intraduodenal and intravenous injection of the tested compounds in the guinea pig before ventricular extrasystoles and cardiac arrest occurred.

Test procedure: Guinea pigs were used which had been subjected to urethane anesthesia. A canula was fixedly inserted into the animals' duodenum above the bile duct juncture. The test compounds were intraduodenally injected in the amounts set forth in the table which follows. In each case the test compound was given in 10 ml./kg. of an aqueous solution containing 1% methylcellulose and 5% dimethylacetamide. The animals' EKG was observed on an oscilloscope and it was determined at what exact time the first ventricular extrasystoles occurred. If, for a period of 4 seconds, no EKG could be read, it was considered that cardiac arrest had occurred. An average of 6 guinea pigs were used for each dose level of each substance.

The test compounds were also administered intravenously by continuous infusion, the same procedures were followed and the results recorded.

TABLE

| Compound | DL I.V., mg./kg. | Intraduodenal dose | | | | | Absorption, percent |
|---|---|---|---|---|---|---|---|
| | | Mg./kg. | Extrasystoles Percent | Min. | Cardiac arrest Percent | Min. | |
| Digoxin | 0.60 | 5 | 100 | 16 | 100 | 32 | ~20 |
| | | 3 | 72 | 24 | 50 | 59 | |
| | | 2 | 67 | 29 | 17 | (99) | |
| Digoxin monomethyl ether (M.P. 226–229° C.) 4''' | 0.79 | 2.5 | 100 | 11 | 100 | 24 | ≥50 |
| | | 1.5 | 81 | 20 | 50 | 67 | |
| Digoxin monomethyl ether (M.P. 227–231° C.) 3''' | 0.82 | 2.5 | 100 | 12 | 100 | 23 | >55 |
| | | 1.5 | 83 | 19 | 83 | 44 | |
| Digoxin dimethyl ether | 1.50 | 5.0 | 100 | 8 | 100 | 14 | >60 |
| | | 2.5 | 100 | 14 | 100 | 28 | |
| Digoxin monoethyl ether | 0.69 | 3.0 | 100 | 8 | 100 | 19 | >>25 |
| Digoxin mono(ethoxymethyl) ether | | 2.5 | 100 | 16 | 100 | 30 | |
| Digoxin di-(methoxymethyl) ether | | 2.5 | 100 | 16 | 67 | 29 | |
| Monoacetyl digoxin monomethyl ether (M.P. 208–212°) | | 2.5 | 100 | 11 | 100 | 21 | |
| Monoformyl digoxin monomethyl ether 3'' ' | | 2.5 | 100 | 12 | 100 | 32 | |
| 4'''-monoacetyl digoxin monomethyl ether (M.P. 147–151° C.) | | 2.5 | 100 | 31 | 67 | 61 | |
| Monopropionyl digoxin monomethyl ether | | 2.5 | 100 | 16 | 100 | 34 | |
| Mono-(ethoxyacetyl)-digoxin monomethyl ether | | 2.5 | 100 | 11 | 100 | 18 | |
| | | 1.5 | 100 | 18 | 50 | 48 | |
| Monoacetyl digoxin mono-(ethoxymethyl) ether | | 2.5 | 100 | 31 | 50 | 61 | |

From the table it can be seen that the lethal dose of digoxin administered intravenously amounted to 0.6 mg./kg. On intraduodenal administration the lethal dose amounted to 3 mg./kg. so that an absorption ratio of 20% results.

The compounds digoxin-4'''-monomethyl ether and digoxin-3'''-monomethyl ether are somewhat less effective than digoxin when administered intravenously. Despite this finding following intraduodenal injection a dose of 1.5 mg./kg. was lethal in 5 and 3 of the 6 animals respectively which were treated with these drugs so that absorption rations of more than 50% were calculated. It can also be seen that digoxin dimethyl ether, digoxin mono-(ethoxymethyl)-ether and digoxin di-(methoxymethyl) ether were more effective than digoxin when administered intraduodenally. 2.5 mg./kg. ID proved to be lethal in the majority of the animals while with the same dose of digoxin, a mortality rate of only 30% can be caculated.

The results of the test are indicative of the fact that the survival time of the animals is directly dependent on the dosage, that is on the effective dosage. Following 3 mg./kg. ID of digoxin-4'''-monoethyl ether the animals were dead in 19 minutes. As compared to digoxin-3'''-monomethyl-ether and digoxin-4'''-monomethyl ether it can be seen that 2 mg./kg. must have also been a lethal dose so that it can be assumed that the absorption ratio is in excess of 35%.

3 mg./kg. digoxin ID produced extrasystoles in 72% of the guinea pigs and resulted in cardiac arrest of 50%. In comparison the compounds of the invention in a smaller dose i.e., 2.5 mg./kg. produced extrasystoles in all of the animals and with the exception of monoacetyl digoxin-4'''-monomethyl ether and monoacetyl-digoxin mono-(ethoxymethyl) ether the same dose resulted in a cardiac arrest in all of the animals. So all compounds in every instance are superior as can be seen not only from the production of the effect noted with smaller doses, but also in that the onset of the effect was more rapid.

The following example serve to illustrate typical pharmaceutical compositions according to the present invention:

EXAMPLE 13

Ampoules were filled with the following solution:

Digoxin monomethyl ether—0.25 mg.
Ethyl alcohol (96%)—0.10 ml.
1,2-propane-diol—0.40 ml.
Distilled water—ad. 1 ml.

The solution was sterilized for 20 minutes at a temperature of 120° C.

EXAMPLE 14

Tablets were prepared by the conventional tabletting methods containing:

| | Mg. |
|---|---|
| Digoxin-monomethyl ether | 0.1 |
| Lactose | 63.34 |
| Dyestuffs | 0.01 |
| Distilled water | 0.7 |
| "Aerosil" (finely dispersed silicic acid) | 0.75 |
| Polyvinyl pyrrolidione ("Plasdone") | 4.0 |
| Methyl cellulose | 1.8 |
| Talc | 3.9 |
| Magnesium stearate | 0.4 |

The tablets were pressed to a hardness of 2.8 kg. and decomposed within 20 sec.

We claim:
1. A digoxin ether wherein one or both of the 3'''- or 4'''-hydroxy groups of the digitoxose moiety are etherified with a member selected from the group consisting of unsubstituted or substituted alkyl containing 1 to 2 carbon atoms wherein said substituent is alkoxy containing 1 to 2 carbon atoms; wherein when only one hydroxy group of said digitoxose moiety is etherified, the second hydroxyl group may be a free hydroxyl group or may be esterified by a member selected from the group consisting of substituted and unsubstituted acyl containing up to 3 carbon atoms wherein said substituent is alkoxy containing 1 to 2 carbon atoms.

2. A compound according to claim 1 designated digoxin-3'''-mono-methylether.

3. A compound according to claim 1 designated digoxin-3'''-mono-ethylether.

4. A compound according to claim 1 designated digoxin-dimethylether.

5. A compound according to claim 1 designated monoacetyl-digoxin-mono-methylether.

6. A compound according to claim 1 designated monoformyl-digoxin-mono-methylether.

7. A compound according to claim 7 designated monoethoxyacetyl-digoxin-mono-methylether.

8. A compound according to claim 1 designated digoxin-4'''-mono-methylether.

9. A compound according to claim 1 designated digoxin-4'''-mono-ethylether.

References Cited

UNITED STATES PATENTS

| 3,148,182 | 9/1964 | Furst et al. | 260—210.5 |
| 3,184,383 | 5/1965 | Hupin | 260—210.5 |
| 3,223,587 | 12/1965 | Wilkinson | 260—210.5 |

LEWIS GOTTS, Primary Examiner

J. R. BROWN, Assistant Examiner

U.S. Cl. X.R.

424—182

UNITED STATES PATENT OFFICE
CERTIFICATE OF CORRECTION

Patent No. 3,538,078  Dated November 3, 1970

Inventor(s) Fritz Kaiser, Wolfgang Schaumann, Kurt Stach and Wolfgang Voigtländer It is certified that error appears in the above-identified patent and that said Letters Patent are hereby corrected as shown below:

Column 1, formula, last part, upper right-hand corner:

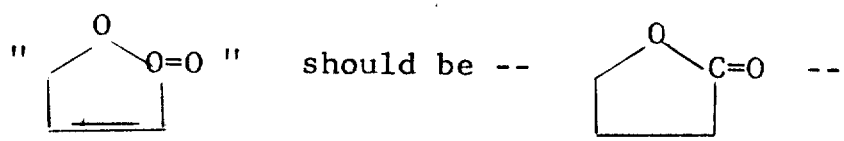

SIGNED AND SEALED
DEC 29 1970

(SEAL)
Attest:

Edward M. Fletcher, Jr.
Attesting Officer

WILLIAM E. SCHUYLER, JR.
Commissioner of Patents